US009671626B2

(12) United States Patent
von und zu Liechtenstein

(10) Patent No.: US 9,671,626 B2
(45) Date of Patent: Jun. 6, 2017

(54) APPARATUS AND METHOD FOR AUGMENTING HUMAN VISION BY MEANS OF ADAPTIVE POLARIZATION FILTER GRIDS

(71) Applicant: Maximilian Ralph Peter von und zu Liechtenstein, Rorschach (CH)

(72) Inventor: Maximilian Ralph Peter von und zu Liechtenstein, Rorschach (CH)

(*) Notice: Subject to any disclaimer, the term of this patent is extended or adjusted under 35 U.S.C. 154(b) by 0 days.

(21) Appl. No.: 15/159,486

(22) Filed: May 19, 2016

(65) Prior Publication Data
US 2016/0282639 A1    Sep. 29, 2016

(51) Int. Cl.
| | | |
|---|---|---|
| G02F 1/1335 | (2006.01) | |
| G02F 1/01 | (2006.01) | |
| G02C 7/12 | (2006.01) | |
| G02F 1/137 | (2006.01) | |
| G02F 1/133 | (2006.01) | |

(52) U.S. Cl.
CPC ............ *G02F 1/0136* (2013.01); *G02C 7/12* (2013.01); *G02F 1/0121* (2013.01); *G02F 1/13318* (2013.01); *G02F 1/13725* (2013.01); *G02F 2203/18* (2013.01)

(58) Field of Classification Search
CPC ... G02C 7/12; G02F 1/0136; G02F 1/133528; G02F 2001/133531; G02F 2001/133538; G02F 2203/18; G02B 23/125
USPC ............................................................ 349/13
See application file for complete search history.

(56) References Cited

U.S. PATENT DOCUMENTS

| | | |
|---|---|---|
| 4,848,890 A | 7/1989 | Horn |
| 4,978,208 A | 12/1990 | Hsu et al. |
| 7,506,976 B2 | 3/2009 | Baiocchi et al. |
| 7,683,983 B2 | 3/2010 | Zhong et al. |
| 8,172,393 B2 | 5/2012 | Tendler |

(Continued)

OTHER PUBLICATIONS

Byoungchoo Park et al., Aligned silver nanowire-based transparent electrodes for engineering polarisation-selective optoelectronics, Scientific Reports 6, Article No. 19485 (2016).

(Continued)

*Primary Examiner* — Paisley L Arendt

(57) ABSTRACT

Methods and apparatus are described herein related to a see through head mountable device (HMD) configured to reduce glare originating from polarized light. Each eyeglass of the HMD is associated with a grid comprising a plurality of dynamically configurable polarization filters placed in the path of the light. A polarization analyzer module analyzes the polarization characteristics of a field of view and performs an optimization calculation. The polarization analyzer controls the said grid via a controller module in such a way that the filter state of each grid element can be addressed separately. The grid of polarization filters causes the polarization characteristics of the incident light to be adapted in such a way as to reduce glare and/or to provide a user of the said head mountable device with an enhanced visual perception of the field of view. The user of the described head mountable device has the option of selection between a plurality of polarization enhancement modes, such as horizontal or vertical polarization filtering only or a hybrid mode combining both horizontal and vertical polarization filtering on an individual basis for each grid element.

11 Claims, 12 Drawing Sheets

(56) References Cited

U.S. PATENT DOCUMENTS

| | | |
|---|---|---|
| 9,237,274 B2 * | 1/2016 | Russell ............ H04N 5/23293 |
| 2004/0046927 A1 | 3/2004 | Montgomery |
| 2014/0101608 A1 | 4/2014 | Ryskamp et al. |

OTHER PUBLICATIONS

Hideo Fujikake et al., Electrically-controllable Liquid Crystal Polarizing Filter for Eliminating Reflected Light, Optical Review vol. 5, No. 2 (1998) 93-98.

Ignatio Moreno et al., Complete polarization control of light from a liquid crystal spatial light modulator, Optics Express, 376, Dec. 21, 2012.

* cited by examiner

APPARATUS AND METHOD FOR AUGMENTING HUMAN VISION BY MEANS OF ADAPTIVE POLARIZATION FILTER GRIDS

CROSS REFERENCE TO RELATED APPLICATIONS

Not applicable to this application.

STATEMENT REGARDING FEDERALLY SPONSORED RESEARCH OR DEVELOPMENT

Not applicable to this application.

FIELD OF THE INVENTION

The present invention relates to augmented vision technology, and more particularly to a see through head mountable device making use of adaptive polarization filter grids in order to optimize glare reduction.

BACKGROUND OF THE INVENTION

Prior Art

Any discussion of the related art throughout the specification should in no way be considered as an admission that such related art is widely known or forms part of common general knowledge in the field. Unless otherwise indicated herein, the materials described in this section are not prior art to the claims in this application and are not admitted to be prior art by inclusion in this section.

Polarized sunglasses have been known since the 1940s, when they were first invented as a means to reduce undesirable glare caused by sunlight bouncing off various surfaces in the field of view. Since those early times polarized sunglasses have enjoyed massive popularity on the consumer market. Continuous improvements have been made to sunglasses-related technology ever since. For example, materials have been developed that have different transmission characteristics over different areas in the field of view. Also eyeglasses have been designed that have different polarizations filters arrangements on an eyeglass, a concept similar to bifocal eyeglasses. Moreover, electronic means exist to selectively block out the glare of the sun by making a portion of the eyeglasses dynamically opaque by controlling liquid crystal multi-cell shutters. It is a recognized problem that polarized sunglasses do not work well with polarized display screens because at particular viewing angles the display turns black. Methods have since been developed that adapt such display devices so that they can be better viewed by users wearing polarized sunglasses. With the advent of see-through head mountable devices designed for augmented reality applications, wearable computer systems have recently reached a level of maturity whereby they have become suitable for performing very processor-intense real-time image processing tasks.

U.S. Pat. No. 4,848,890 issued on Jul. 18, 1989 to Michael Horn discloses a novel visor with point sun blocking.

U.S. Pat. No. 7,506,976 issued on Mar. 24, 2009 to Baiocchi et. al. relates to a polarized transparent element wherein different portions of the glass are having a different luminous transmittance.

U.S. Pat. No. 7,683,983 issued on Mar. 23, 2010 to Zhong et al. relates to a liquid crystal display that emits circularly-polarized light and thereby reduces perceived distortion when the display is viewed through linearly-polarizing filters such as polarized sunglasses.

U.S. Pat. No. 8,172,393 issued on May 8, 2012 to R. Tendler relates to polarized eyeglasses and more particularly to a method and apparatus for viewing instrumentation that has a polarized display.

US patent application 2014/0101608 teaches a general purpose user interface for see through augmented reality type head mountable devices.

US patent application 2004/46927 teaches a new category of bifocal sunglasses utilizing a vertically polarized upper lens portion and a non-polarized light absorbing lower lens segment mechanically affixed to the upper portion.

SUMMARY

The present invention recognizes that it is desirable to dynamically adapt the polarization characteristics of eyewear according to environmental factors. In other words the eyewear should be able to adapt itself to the scene being viewed by its wearer. Such adaptation is generally not possible without using electronic image processing means. Before the advent of augmented reality type head mountable devices there were only limited means available to achieve that goal. The known prior art is generally restricted to methods of turning a part of the eyeglass opaque, so as to block out the glare of the sun and leave all other parts of the eyeglass transparent.

The present invention solves the problem of eliminating glare originating from specular reflections by making use of a grid of electrically configurable polarization filters incorporated into the eyeglasses. Electrically configurable polarization filters are taught in the prior art as a combination of a stack of voltage-controlled polarization rotators followed by an anisotropic absorber. The present inventor has realized that it is advantageous to miniaturize such polarization filters in such a way that a plurality of the said polarization filters is arranged as a grid, wherein each grid element can be controlled independently of the other grid elements. Each grid element is intended to be small enough as to be no longer individually discernible by the naked eye and is therefore also similar in character to a pixel in a conventional spatial light modulator. A novel polarization optimizing controller is furthermore disclosed. Various embodiments of the invention are disclosed which enable the reduction of glare from reflections off both horizontal and vertical surfaces at the same time. Other embodiments can also work with additional filter angles other than merely horizontal and vertical. Therefore glare can be eliminated or substantially reduced at any angle of reflection. Moreover, embodiments are introduced which enable the viewing of polarized display screens without the display appearing black at any viewing angle, whilst at the same time eliminating glare from specular reflections. The present invention also introduces a novel type of see-through head mountable device which incorporates dynamic and real-time optimization of polarization filtering.

This disclosure also details various embodiments of a suitable user interface for the described polarization optimizer, relating to the preferred embodiment in the form of a see through head mountable augmented reality type device.

There has thus been outlined, rather broadly, some of the features of the disclosed polarization optimizer technique in order that the detailed description thereof may be better understood, and in order that the present contribution to the art may be better appreciated. There are additional features of the polarization optimizer technique that will be described hereinafter and that will form the subject matter of the claims appended hereto. In this respect, before explaining at least one embodiment of the polarization optimization technique in detail, it is to be understood that the polarization optimization technique is not limited in its application to the details of construction or to the arrangements of the components set forth in the following description or illustrated in the drawings. The polarization optimization technique is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

In order to be able to build an embodiment of the present invention a number of complex technological challenges have to be addressed. Most significantly it is necessary to be able to construct a transparent pixel-type grid of miniaturized and electrically controllable polarization filters. These polarization filters require suitable polarization rotators as a key component. Also a polarization analyzer is specified which is capable of analyzing the polarization characteristics of a real-world scene and to subsequently translate the analysis into command inputs for a controller module of the said grids in order to provide a user of one of the described embodiments with a polarization enhanced view of a real world field of view.

B. Example Polarization Rotators

Figure 3:
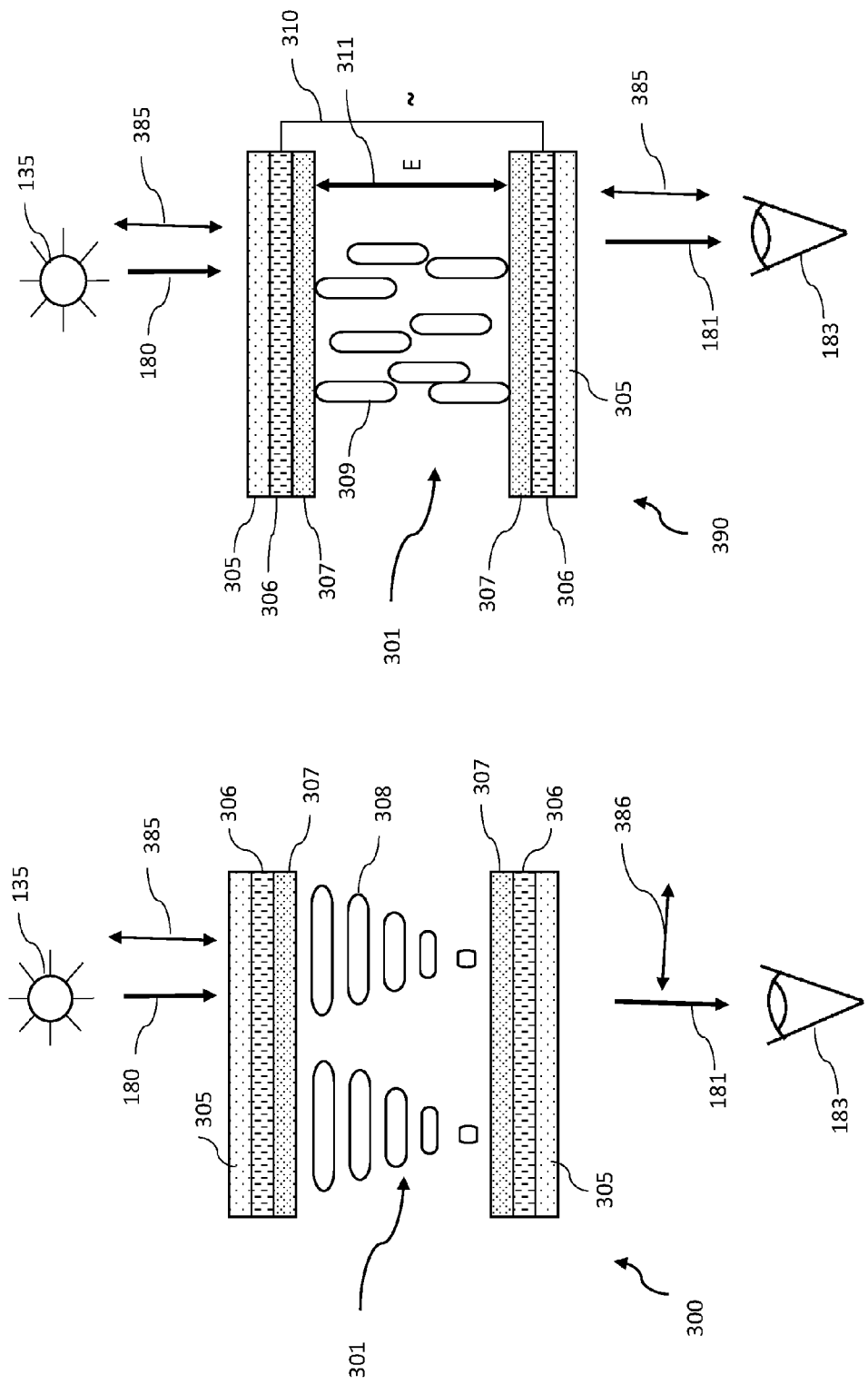
FIG. 3 is a schematic diagram illustrating a polarization rotator, according to an example embodiment.

FIG. 3 depicts a twisted nematic liquid crystal cell 300 which consists essentially of a liquid crystal layer 301 placed between two treated glass substrates 305. The inner-surfaces of the cell 300 are composed of two layers 306 and 307. The first layer 306 is a transparent electrode comprising silver nano (AgNW) wires in the preferred embodiment but indium tin oxide, fluorine doped tin oxide and doped zinc oxide would be examples of other materials constituting viable alternatives. The main advantage of utilizing silver nanowire technology in the preferred embodiment is that silver nanowire films allow excellent transmittance and conductance and are therefore a preferred material for a transparent and flexible electrode in comparison to the brittle indium tin oxide traditionally used in transparent electrodes. An embodiment of the present invention requires optimal transmittance characteristics from the transparent electrodes. The transparent electrodes used for the various embodiments should also exhibit only a minimum of in-plane optical anisotropy, thus the absorption characteristics of such electrodes need to be as isotropic as possible in order to ensure that light of all polarization angles is absorbed equally, at least until the point where it has been directed through the stack of polarization rotators and through an anisotropic absorber at the end of each stack (or alternatively a single absorber in the optical path following the plurality of stacks). Other than silver nanowire and the traditional indium tin oxide, other transparent conducting oxides may also serve the requirements placed on the transparent electrode. Moreover, organic materials such as carbon nanotube networks and graphene may also be used as potential alternatives. The transparent electrode layer 306 permits the application of an electrical field 311 across the cell as well as switching the cell between the OFF state 300 and the ON state 390. The second layer 307 is responsible for the homogenous alignment of the liquid crystal. In the preferred embodiment of the present invention it comprises a rubbed polyimide layer of about 100 nm.

The liquid crystal alignment at both sides of the cell is defined during cell manufacturing. By careful control any twist-angle can be induced in the helical structure across the liquid crystal layer. With a twist-angle of exactly 90 degrees, the standard 90 degree twisted nematic cell is formed. Twist-angles of less than 90 degrees form the low-twist cell whereas by definition, super-twist cells are cells that possess twist-angles exceeding 180 degrees. The preferred embodiment of the present invention uses a standard cell comprising a 90 degree twist.

The two glass 305 substrates are separated by spacers of usually between 3 mm and 20 mm and are typically sealed with glue. When the polarization rotator is in the OFF state 300, the helical structure formed by the liquid crystal molecules rotates the entrance polarization. In the ON state 390 the polarization rotary power is suspended and the polarization state of the light entering normally to the entrance surface 180 is not altered by the twisted nematic cell. In FIG. 3 a light source 135 produces incident light 180 of a vertical polarization state 385, whereby on passing through the twisted nematic cell 300 in the OFF state the exiting light 181 is changed to a state of horizontal polarization 386 before reaching a human eye 183. Correspondingly in the ON state 301 of the twisted nematic cell the vertical polarization state 385 of the incident light 385 remains unchanged in the exiting light 181.

A 100 percent efficient rotation of a linear entrance polarization can only be obtained in the limit of large cell thickness and in general the exiting light 181 becomes elliptically polarized with components oscillating in directions lying both parallel and perpendicular to the exit liquid crystal molecules. Furthermore, it is the optical path difference in the liquid crystal cell that affects the overall magnitude of the polarization efficiency for the twisted nematic cell.

In exemplary implementations, the transmitted intensity I that passes through a polarization rotator is modeled by Malus' law (Eq. 1):

$$I = I_0 \sin^2(\theta) \qquad \text{(Eq. 1)}$$

where $I_0$ is the intensity after passing through the polarization rotator and $\theta$ is angle of polarization after passing through the liquid crystal layer. This model only strictly applies for rays of incident light oriented perpendicular to the plane of the transparent electrode of the polarization rotator cell. At oblique angles birefringence of the liquid crystal produces elliptical, rather than linear, polarization states. However, this model is a close approximation for the viewing angles considered in the proof-of-concept embodiment. For the proof-of-concept embodiment a nematic liquid crystal mixture (supplied by Chisso, birefringence Δn=0.137) with chiral dopant was sandwiched between 50 nm thick rubbed polyimide alignment films (AL-1254 supplied by Japan Synthetic Rubber) on indium tin oxide electrodes of transparent glass substrates. The rubbing directions of the two alignment films were crossed at 45 degrees or 90 degrees. The thickness d and Δn of the twisted nematic liquid crystal cells are needed to satisfy the following relation, called the Mauguin limit to obtain sufficient polarization rotatory power for incident light of wavelength λ

$$\lambda nd > 2\lambda \qquad \text{(Eq. 2)}$$

According to the above equation (Eq. 2) for white light of visible light wavelength, the thickness d was determined at 10 μm, and was suspended using spherical plastic spacers dispersed uniformly in the twisted nematic liquid crystal cells.

C. Example Electrically-Controllable Liquid Crystal Polarizing Filters

FIG. 4 shows an example embodiment of electrically-controllable polarizing filters using two different twisted nematic liquid crystal cells as a polarization rotator. It is composed of 45 degree (404) and 90 degree (406) twisted nematic liquid crystal cells and a fixed polarizing film 408. The light with arbitrary polarization plane at angle θ to the optical transmitting axis of the polarizing film 402 is incident to the 45 degree twisted nematic liquid crystal cell 404. The 45 degree and 90 degree twisted nematic liquid crystal cells are piled up so that the alignment directors of liquid crystal molecules in these two cells are twisted continuously along the optical path through the twisted nematic liquid crystal cells without any external voltage. The liquid crystal director on the output side of the 90 degree twisted nematic liquid crystal is parallel to the transmitting axis of the polarizing film. When the twisted nematic liquid crystal cells are driven independently by an external voltage applied to transparent electrodes of silver nanowire or indium tin oxide, the polarizing filter operates as follows: the two twisted nematic liquid crystal cells without applied voltage rotate the polarization plane of linearly-polarized incident light through 45 degrees and 90 degrees, according to the optical rotatory power known as the twisted nematic effect. This phenomenon is caused by the difference between the refractive indices for right circularly and left circularly polarized light components of the linearly-polarized incident light based on the helical liquid crystal alignment structure. As the liquid crystal directors in the two twisted nematic liquid crystal cells are twisted continuously through the two cells, the polarization rotatory powers in the two twisted nematic liquid crystal cells are added. The incident polarization plane is therefore rotated through 135 degrees. Otherwise, when sufficient voltage is applied through circuits 405 and 410 to both twisted nematic liquid crystal cells, the liquid crystal molecules in the two twisted nematic liquid crystal cells are realigned parallel to the applied electric field. The twisted alignment of liquid crystal molecules in the twisted nematic liquid crystal cells is unwound, so the incident polarization plane is not rotated by these cells.

When the polarization rotatory power of either twisted nematic liquid crystal cell disappears under sufficient applied voltage, the serial combination of the two twisted nematic liquid crystal cells can rotate the incident polarization plane through 45 degrees or 90 degrees. Consequently, by controlling the voltages applied to the twisted nematic liquid crystal cells, using electrical switches 405 and 410 shown in FIG. 4A, the polarization plane of incident light 400 is rotated through 0 degrees, 45 degrees, 90 degrees or 135 degrees, depending on the combination of the on/off-states of 405 and 410. The unwanted reflected light is absorbed by the fixed polarizing film 408, after its polarization plane is rotated to the optimum angle at a 45 degrees interval.

The fabricated 45 degrees and 90 degrees twisted nematic liquid crystal cells are piled up compactly with a polarizing film (supplied by Luceo), which has comparatively small dependence of light transmittance on the visible wavelength. The total transmittance of the filter for unpolarized white light is approximately 30 percent. The light transmittance can be increased by reducing light reflection at the surfaces of the twisted nematic cells and the polarizing film. This improvement is achieved in a preferred embodiment by depositing anti-reflection dielectric thin films on the cell surfaces, and it also prevents a flare effect of the object image when strong light is incident to the polarizing filter.

Figure 4A:
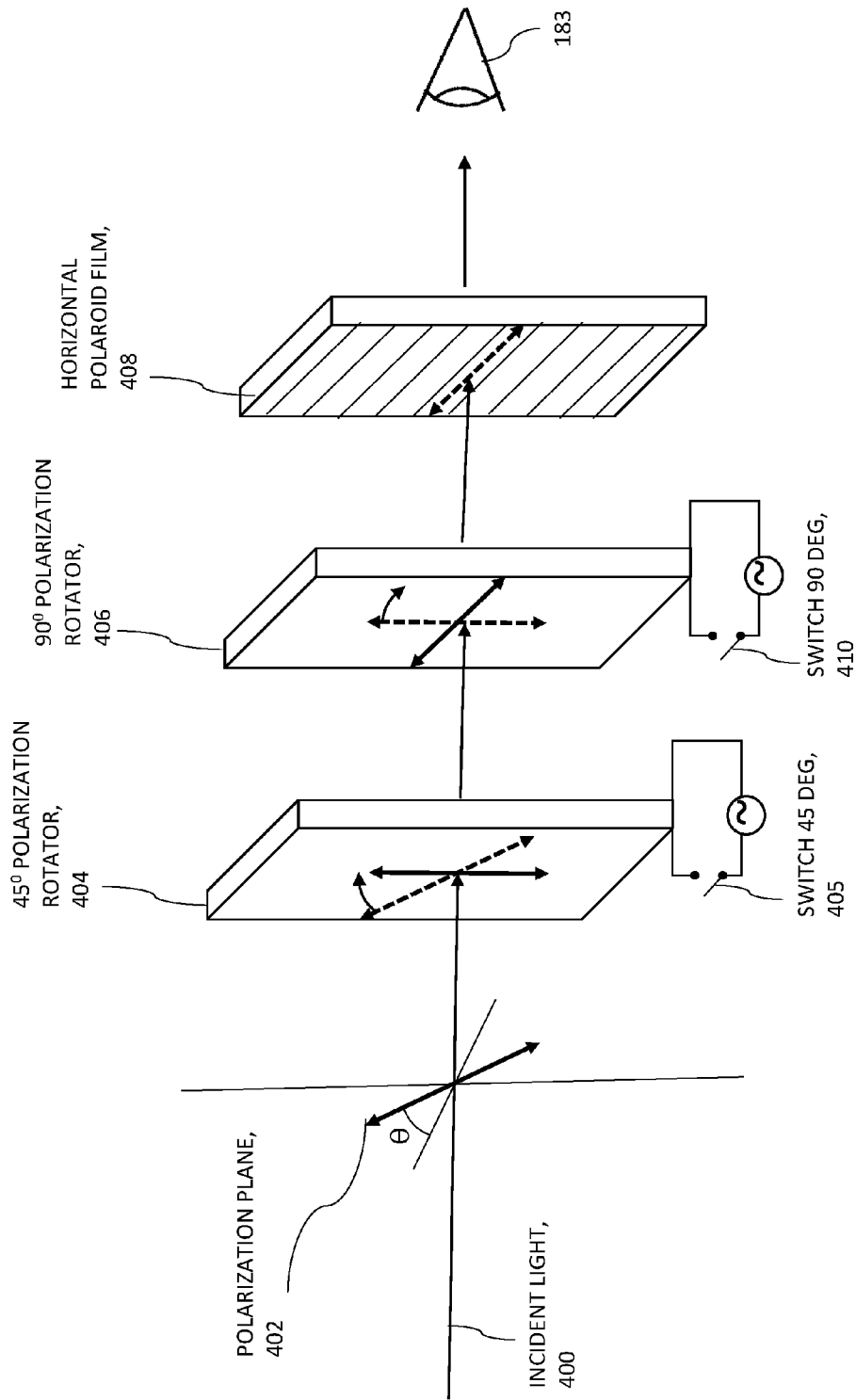
FIG. 4A is a schematic diagram illustrating an electrically controllable polarization filter comprising polarizing film as an anisotropic absorber, according to an example embodiment.
Figure 4B:
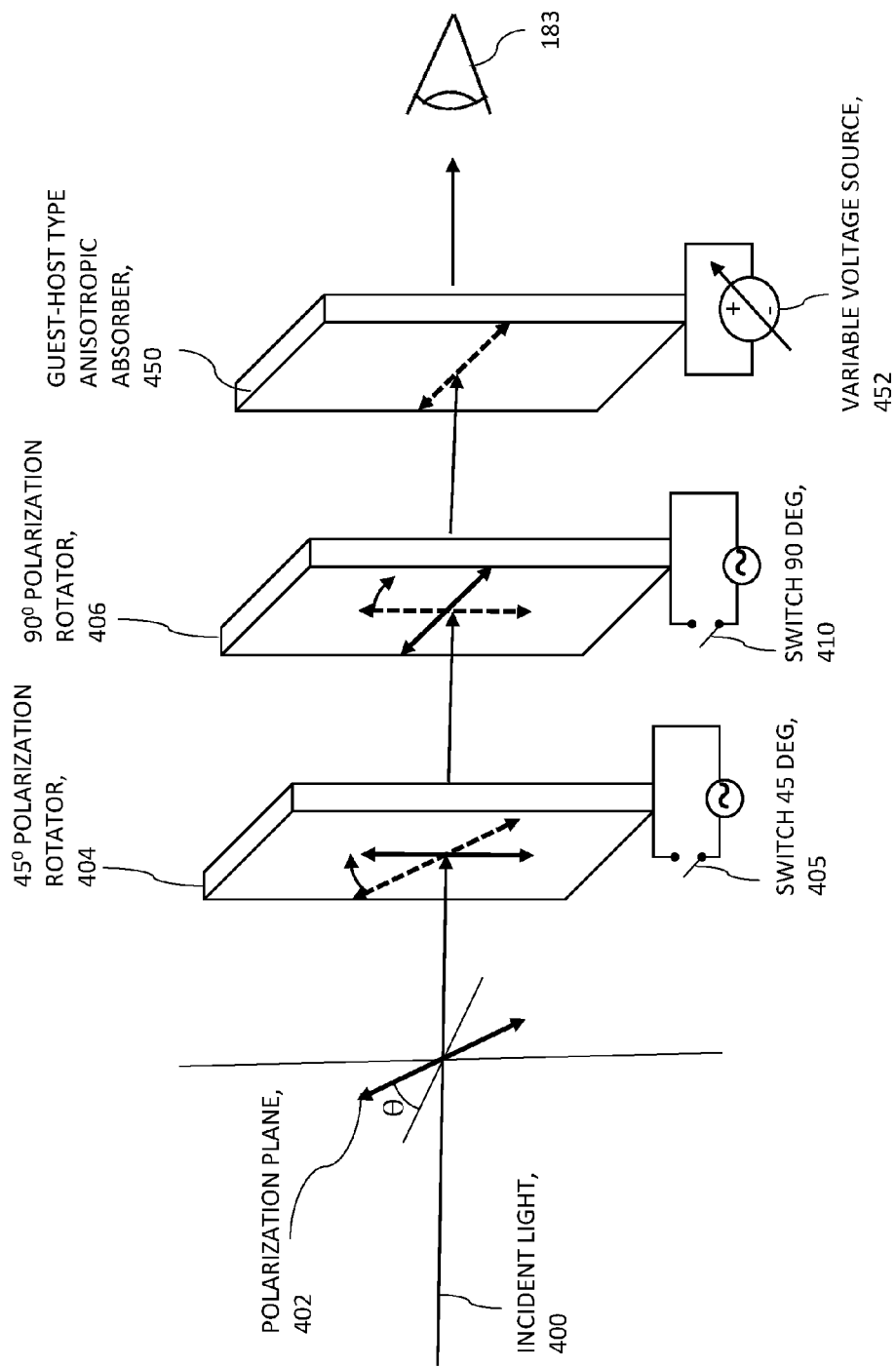
FIG. 4B is a schematic diagram illustrating an electrically controllable polarization filter comprising a guest-host type liquid crystal cell as an anisotropic absorber with an added functionality of dynamic luminosity control, according to an example embodiment.

Instead of the polarizing film 408, a guest-host type of homogeneous nematic liquid crystal cell containing black dichroic dye may be used as the anisotropic absorber in an alternative embodiment. A schematic diagram of that embodiment is illustrated in FIG. 4B. In that embodiment the light absorbance as well as the polarization angle can be controlled. This is because light absorption of the guest-host type liquid crystal cell for polarized light varies significantly with the external voltage 452 applied to transparent electrodes of the guest-host type liquid crystal cell 450. Those skilled in the art will realize that other than polarizing film or guest-host type liquid crystal cells any other anisotropic absorber of polarized light can be used in alternative embodiments.

The transmitted light from the polarizing filter becomes minimum when the incident polarization angle is 90 degrees because the twisted nematic liquid crystal cells do not rotate the incident polarization plane in a state wherein the twisted nematic liquid crystal cells are driven by the applied voltage. When removing the applied voltage from one or both of the twisted nematic liquid crystal cells, the polarization angle for minimum transmittance is shifted from 90 degrees. The deviation angles correspond to the polarization rotation angles in the two twisted nematic liquid crystal cells. Since the polarizing filter of the described embodiment selectively suppresses incident light with polarization angles of 0 degrees, 45 degrees, 90 degrees and 135 degrees, more than 80 percent of polarized light for arbitrary polarization angles other than 0 degrees, 45 degrees, 90 degrees and 135 degrees can be eliminated by changing the combination of on/off states of switches 405 and 410. Those skilled in the art will appreciate that even though the preferred embodiment of the present invention comprises four pre-set polarization angles for the polarizing filter, other configurations are also possible. In particular an embodiment of the invention is configured only for polarization angles 0 degrees and 90 degrees comprising only a single polarization rotator.

D. Example Polarization Filter Grid Controllers

Figure 5:
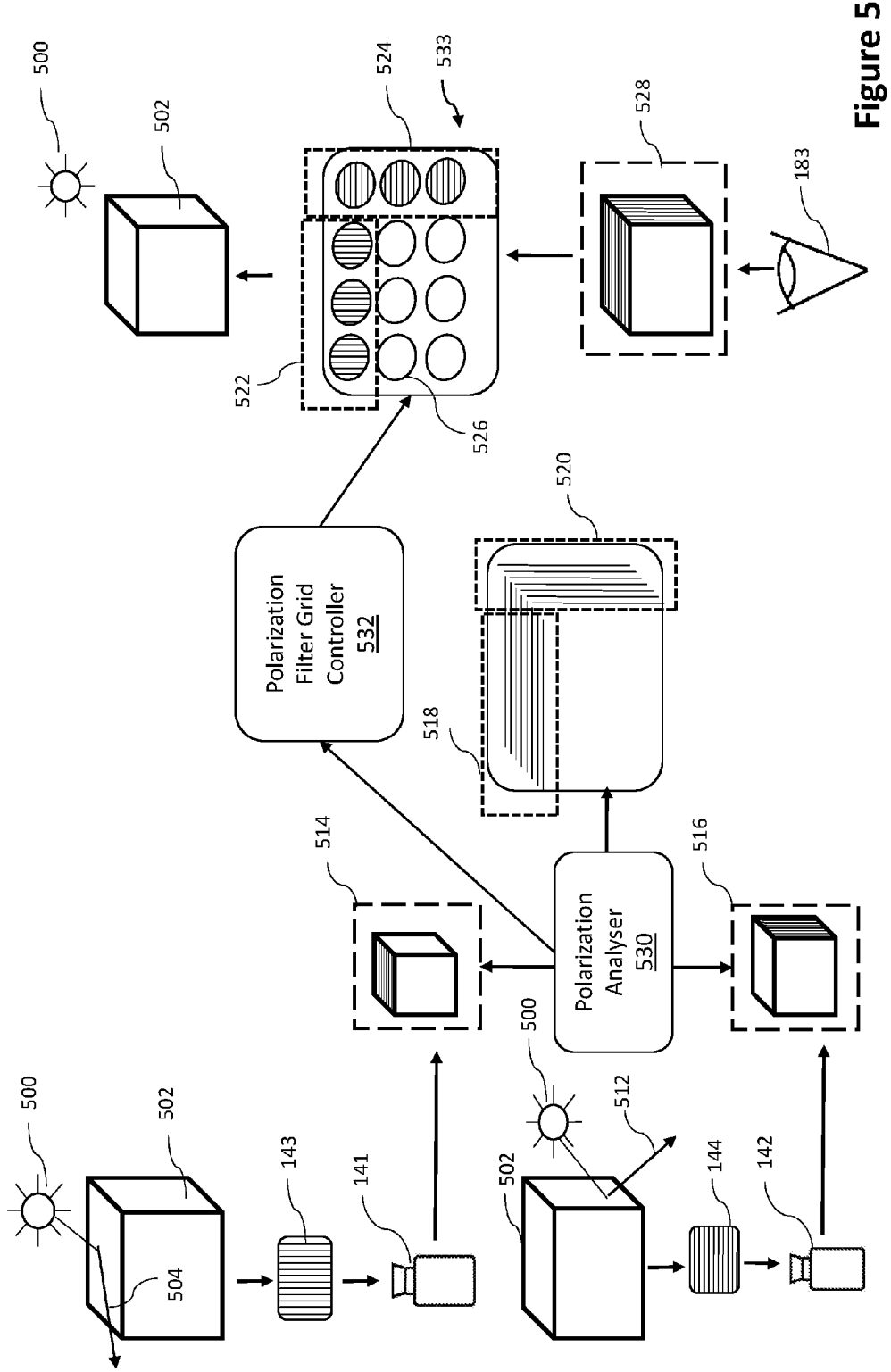
FIG. 5 is a schematic diagram illustrating the overall architecture of an example embodiment featuring an adaptive grid of polarization filters.

The present invention makes uses of a plurality of polarization filter grids 110 and 112 in order to present a user of a head-mountable device with a view of their surroundings which is optimized in terms of polarization filtering. It has already been specified in the previous sections how an individual grid element of the said polarization filter grid may be implemented in various embodiments. This section specifies how the grid itself is controlled in the sense of how various embodiments may determine the target polarization filter state for each grid element. FIG. 5 shows an example embodiment wherein for simplicity only vertical and horizontal polarization states are processed, therefore in that embodiment the grid elements of the polarization filter are only set to either horizontal or vertical polarization. However those skilled in the art will appreciate that the invention can be practiced with an arbitrary number of polarization states. The preferred embodiment has 4 polarization filter states for each grid element, namely 0 degrees, 45 degrees, 90 degrees and 135 degrees. In the simple embodiment of FIG. 5 which is restricted to the filter states of 0 degrees and 90 degrees, two separate image capture devices 141 and 142 are utilized. The image capture devices take images of the field of view of the user through polaroid filters 143 and 144, wherein filter 143 is a vertically transmissive filter and filter 144 is a horizontally transmissive filter. Those skilled in the art will appreciate that other configurations are possible in order to capture the field of view with different polarization filters, so that these images may be compared with each other in the following steps. Following is a subset of the possible alternatives. It is possible to have a camera for each eye and for each polaroid filter. The said constellation would thus comprise four such cameras in total. The advantages of such constellation would be that the required images could be captured in parallel, as opposed to sequentially, as would need to be the case in a single camera embodiment. The advantage of having cameras corresponding to each eye, as opposed to mounting the cameras in a central position between the eyes is that it then becomes possible to adapt the polarization filter grids for a particular eye, meaning that the filter grid for the left eye would be controlled independently of the filter grid for the right eye. In this way, having separate cameras for each eye ensures that parallax effects can be easily compensated for. The preferred embodiment uses a camera for the left eye coupled with a polaroid sheet of horizontal polarization in front of its lens and a camera for the right eye coupled with a polaroid sheet of vertical polarization in front of its lens, however it is immaterial which eye camera is coupled with which polarization filter. What is important in the preferred embodiment is that the camera for each eye is coupled with a polaroid sheet of opposite polarization as that for the other eye. It is not necessary to use polaroid sheets as polarization filters for the respective camera. An embodiment of the present invention uses only a single camera prefixed with an electrically controlled twisted nematic polarization filter of a similar type as described in the preceding section. The advantage of using electrically controlled polarizations filters in conjunction with the polarization analyzer cameras is that more polarization filter states can be analyzed without having to add a separate camera/polaroid combination for each desired polarization angle. An advantageous combination is to have a separate camera for each eye and to prefix each of it with said electrically controlled twisted nematic polarizing filter. The cameras then simultaneously capture images in sequence of polarization state. So both the said left-eye camera and right-eye camera would first capture an image each in a 0 degree polarization filter setting, followed by images at 45 degree, 90 degree, and 135 degree of polarization setting respectively. However, any other sequence of any polarization angle is also possible.

In the embodiment described in FIG. 5 the image capture process results in image 514, taken in combination with a vertical polaroid filter and image 516, taken in combination with a horizontal polaroid filter. The images in the example have both captured the same real-world object 502, which is illuminated by an unpolarized light source 500. The real-world object 502 features a horizontal top surface. When unpolarized light reflects off that top surface it becomes horizontally polarized. The reflected light 504 and 512 is what causes undesirable glare. Filter 143 is configured to only let through light of vertical polarization, therefore in image 514 the amount of glare coming off the top surface of the real-world object 502 is greatly reduced. On the other hand, image 516 eliminates the glare coming of the right side of the real-world object 502. The said right side of the said object is a vertical surface and as such the light that reflects off that surface is substantially of vertical polarization. As a result of filtering out such vertical polarization with polaroid sheet 144 on image 516 the glare coming of the right side of the said object is greatly reduced. Both images 516 and 516 are subsequently analyzed by the polarization analyzer component 530. The images are processed as a matrix of picture elements or pixels. Each pixel of image 514 is then compared to each corresponding pixel of image 516. The comparison involves estimating which one of the compared pixels comprises the least amount of glare. Once that pixel has been identified it also identifies the filter associated with the image that the pixel corresponds to. The polarization analyzer 530 populates a pixel matrix comprising optimal polarization filter settings for each pixel. Each element of the said matrix therefore contains information as to which of the available polarization filters produces the least amount of glare for the said pixel. The next step that the polarization analyzer 530 performs is a smoothing step. The present inventor has found out that for a good user experience it is essential that noticeable isolated and abrupt changes in polarization filtering need to be avoided. An example would be a surface of a real-world object which is represented by 100 pixels on the said polarization analyzer matrix. If, in the example, the polarization analyzer determines that 5 of these pixels, randomly distributed, are at an optimum with a horizontal polaroid filter and 95 of these pixels are at an optimum with a vertical polaroid filter, then the smoothing step would set all 100 pixels to a horizontal filter setting. Without the smoothing step the real-world surface would eventually be viewed by a user of the present invention as containing spots or blotches of a slightly different shade than the rest of the surface. The smoothing step therefore aims to identify distinct zones of pixels for a particular filter setting. The smoothing step, however, becomes obsolete if the polarization filter matrix comprises enough elements that an individual pixel can no longer be discerned by the naked eye. The present inventor has estimated that the resolution of the pixel matrix, and by extension the associated filter grid, should ideally be to be at least 640 by 480 before it becomes advisable to forego the smoothing step. In the example of FIG. 5 the polarization analyzer is able to determine that image area 518 benefits from a vertical polaroid filter and that image area 520 benefits from a horizontal polaroid filter. If there are any image areas that are indeterminate in terms of polarization optimization, then a default polarizing filter setting is being applied to these areas. In a preferred embodiment the default polarization filter state is set to allow vertical transmission in analogy to traditional polarized eyeglasses designed for sun protection. A preferred embodiment also configures the polarizing filter grid in such a way that when the device is not powered up all polarizing filters remain in the default setting, which means that they are set to allow transmission of vertically polarized light. Once the polarization analyzer 530 has identified preferred polarization filter settings for distinct image areas, the polarization filter grid controller 532 is invoked as the next step. The purpose of the polarization filter grid controller 532 is to translate the calculated polarization filter targets into control inputs for the plurality of individual polarization rotators 526 housed within the grids of polarization filters 533. Hence area 518 which has been determined to benefit from a vertically transmissive polarization filter is mapped to the polarization filters demarcated by 522. The said polarization filters are subsequently set to become vertically transmissive by the polarization filter grid controller 532. Correspondingly the polarization filters demarcated by 524 are set to horizontally transmissive by the polarization filter grid controller 532. The remaining polarization filters in the example belong to areas of indeterminate polarization optimum and are therefore set to the default polarization filter setting. As a result of the steps described in the example the real-world object 502 appears to a human eye 183 in a way that glare originating both from the horizontal and vertical reflections from the object surfaces is equally reduced in the image 528 that the user 210 perceives.

Figure 2:
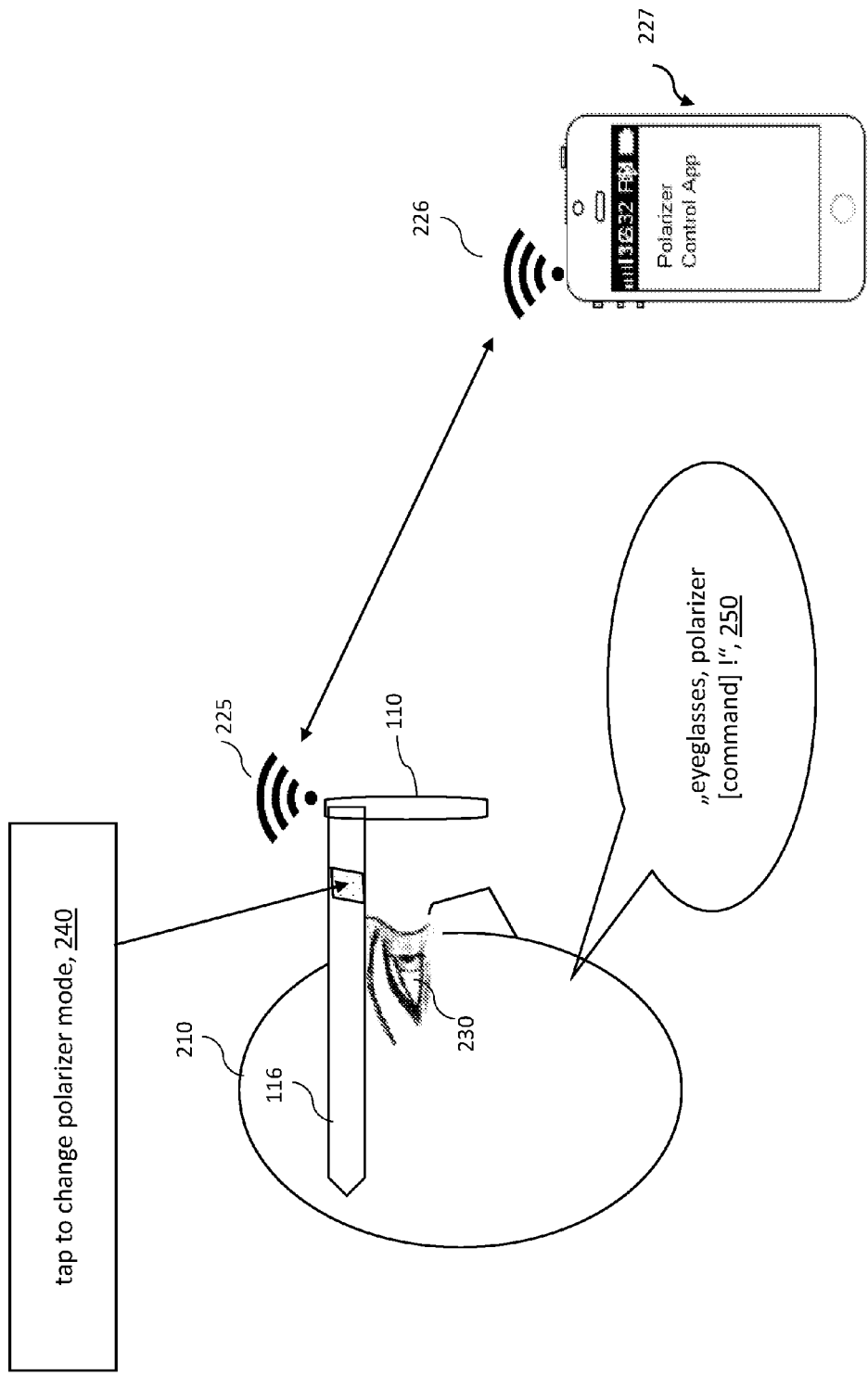
FIG. 2 shows a user interface scenario related to setting polarizer modes, according to an example embodiment.
Figure 9:
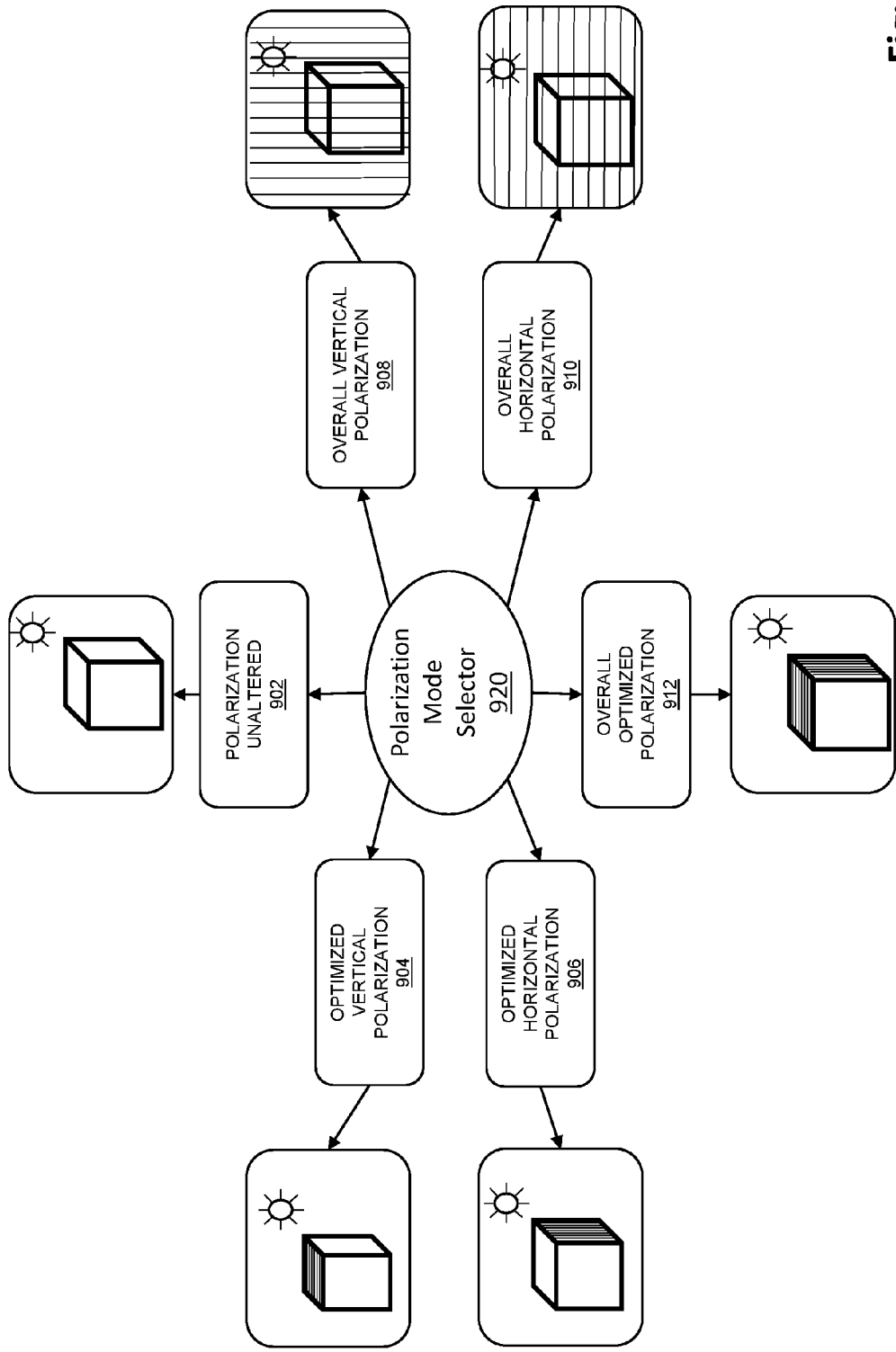
FIG. 9 is a schematic diagram illustrating the various polarizer modes which are selectable according to an example embodiment.

The preferred embodiment comprises six distinct polarization modes, namely polarization unaltered 902, overall vertical polarization 908, overall horizontal polarization 910, optimized vertical polarization 904, optimized horizontal polarization 906 and overall optimized polarization 912, as is depicted in FIG. 9. The preferred embodiment allows a user of a head mountable device 102 to switch between the various polarizer modes, via the polarization mode selector 920, by either tapping the touchpad 124, by issuing a voice command 250 or by a smartphone app 227 (as depicted in FIG. 2). The "polarization unaltered" mode attempts to render real-worlds objects as they would be experienced by a user wearing non-polarized sunglasses. The "overall vertical polarization" mode simulates what a user would see if they wore sunglasses equipped with a vertically transmissive polaroid filter. Consequently the "overall horizontal polarization" mode simulates what a user would see if they wore sunglasses equipped with a horizontally transmissive polaroid filter. The "optimized vertical polarization" mode attempts to selectively suppress reflections off horizontal surfaces, whereas the "optimized horizontal polarization" mode attempts to selectively suppress reflections off vertical surfaces. The "overall optimized" mode attempts to selectively suppress reflections both off horizontal and vertical surfaces. The difference between the "optimized" and the "overall" modes is that in the "optimized" mode all image areas which are not subject to glare will appear as they would appear to a person wearing non-polarized ordinary sunglasses. One major advantage of the "optimized" setting is that the user is able to view a liquid crystal computer display, television screen or digital watch, for example, without the screen appearing to become black when viewed at certain angles. Therefore the "optimized" setting attempts to eliminate the undesired side effects exhibited by sunglasses coated with polaroid film. Those skilled in the art will appreciate that the present invention may also be practiced with other polarizer modes and other combinations of such.

Figure 6:
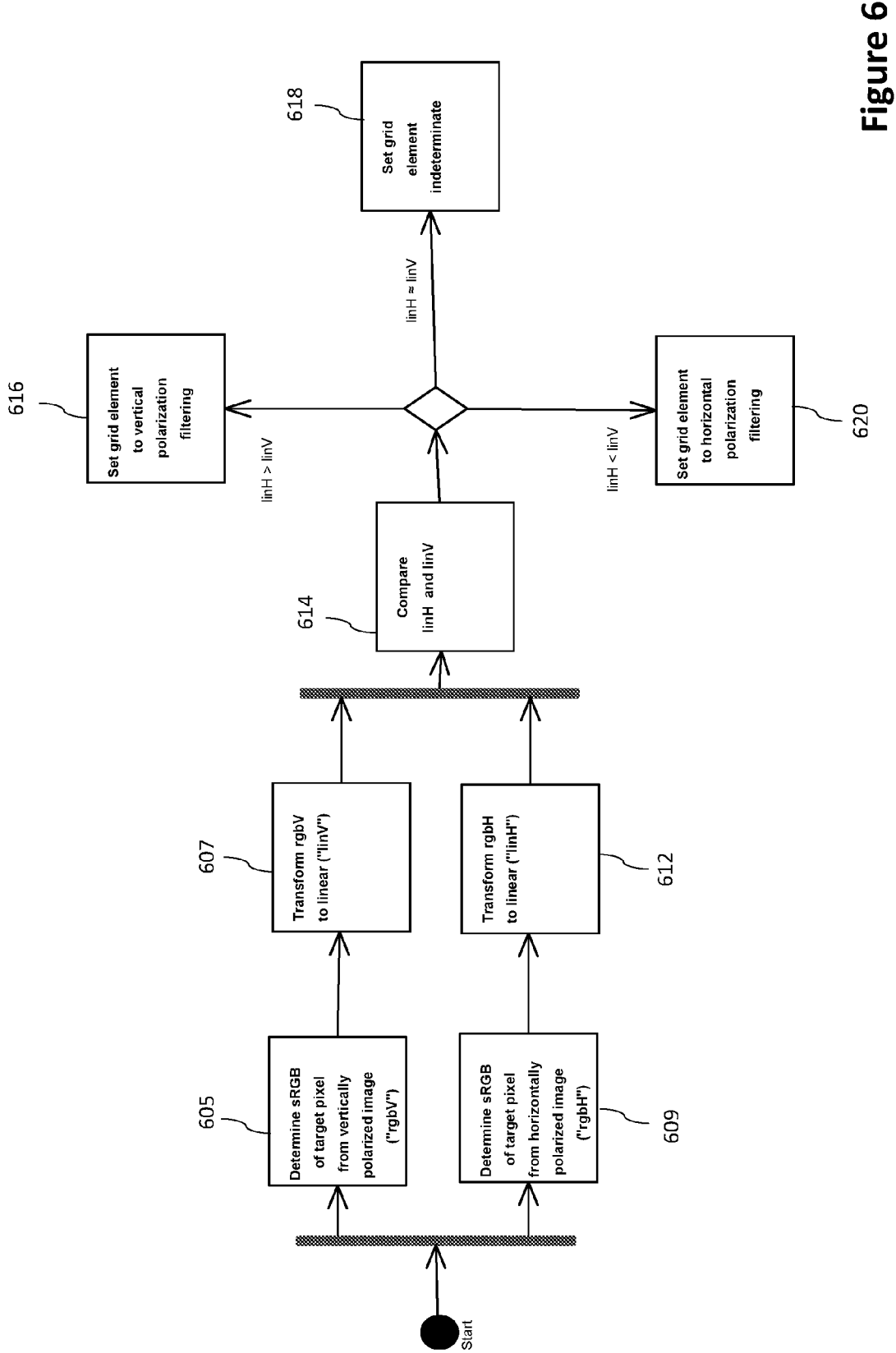
FIG. 6 is a flow chart illustrating a method for determining a preferred polarization filter state, according to an example embodiment.
Figure 7:
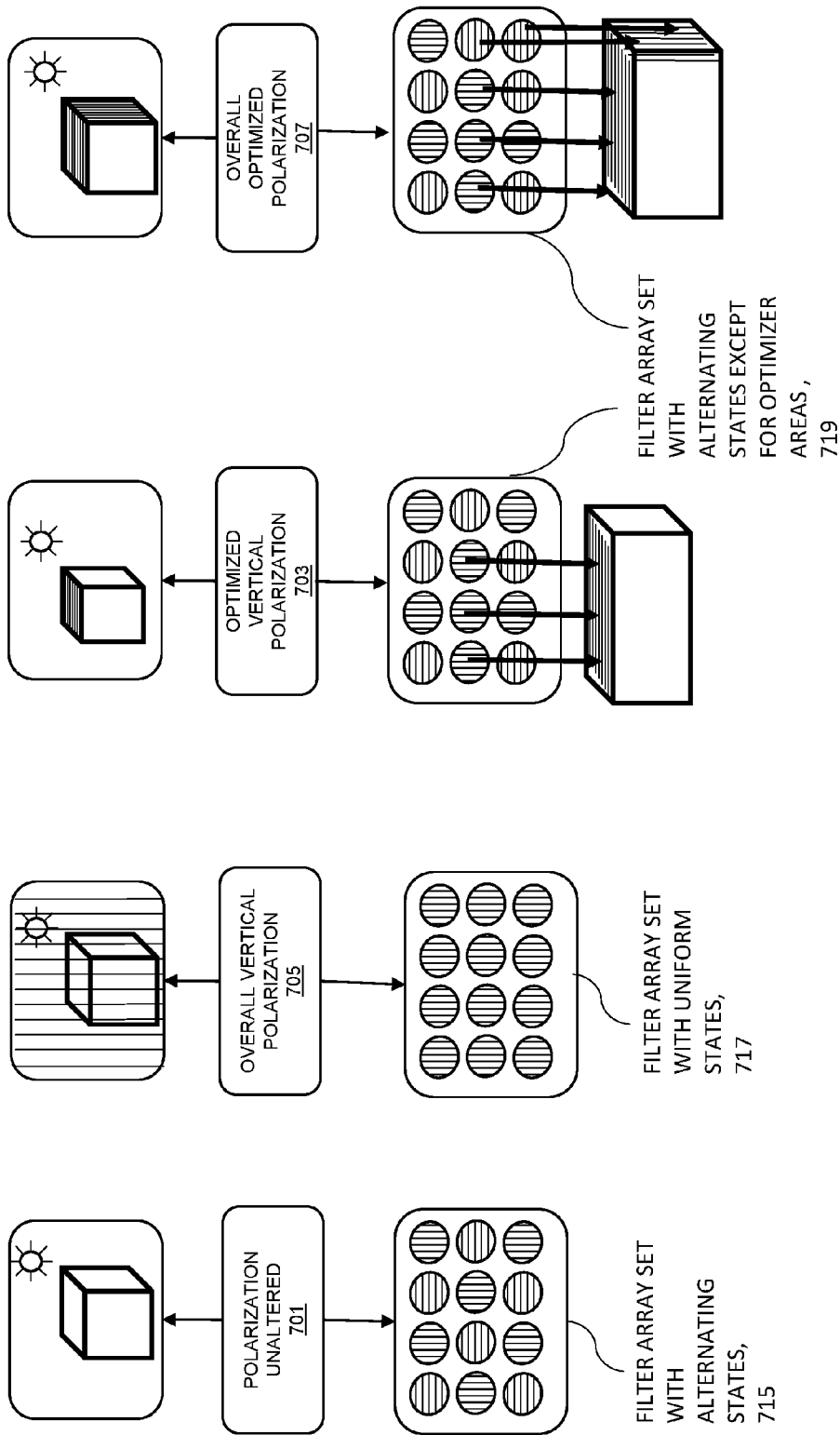
FIG. 7 is a schematic diagram illustrating different filter states corresponding to various polarizer modes, according to an example embodiment.

FIG. 7 depicts how the various polarization modes of the preferred embodiment may be realized. The "polarization unaltered" 701 mode is a particular challenge since the apparatus used for the preferred embodiment does not allow to bypass a polarizing filter cell. Therefore the cell will always be transmissive to a particular polarization angle whilst blocking all other angles. The present inventor has solved the problem of implementing a "polarization unaltered" mode by configuring the filter cells for alternate polarization states. Therefore each row of the filter grid sets the grid elements to an alternate target state 715. If, for example, the first filter cell is configured for vertical transmission, then the next filter cell is set to horizontal transmission, the next filter cell again to vertical transmission and so on. As long as the filter grid has a high enough resolution (ideally better than an grid of 800 by 600 filter cells), the user is no longer able to discern the alternating filter states and the user perception becomes similar to the scene being viewed with non-polarized sunglasses. For the "overall vertical polarization" 705 state the individual cells of the filter grid 717 are all configured to transmit light of the same polarization angle of 90 degrees. For the "overall horizontal polarization" state (not depicted) the same principle is used albeit with a uniform polarization angle of 0 degrees. For the "optimized vertical polarization" state, at first all cells are configured for the alternating polarization sequence depicted in 701 as "polarization unaltered". With the assistance of the polarization analyzer module 530 reflections off horizontal surfaces are identified and eliminated by selectively setting the corresponding filter cells of the filter grid 719 to vertical transmission mode 703. For the "optimized horizontal polarization" mode (not depicted) the same method is used as for "optimized vertical polarization" with the exception that glare reflecting off vertical surfaces is by eliminated by setting distinct filter cells to vertical transmission only. The "overall optimized polarization" mode 707 is a combination of the "optimized horizontal polarization" mode and the "optimized vertical polarization" mode 703. Consequently glare reflecting off both vertical and horizontal surfaces is eliminated by setting distinct filter cells corresponding to identified areas of glare to vertical or horizontal transmission only. All other cells are configured to work with alternating polarization settings. FIG. 6 depicts the steps taken by the polarization analyzer to determine the preferred polarization filter setting for a given pixel. In the example embodiment of FIG. 6 the polarization analyzer takes as input the image 514 taken with a horizontal polaroid filter and the image 516 taken with a vertical polaroid filter. The polarization analyzer then normalizes the images and transposes them onto an image matrix wherein each matrix element corresponds to a filter cell in the grid of polarization filters. For each element of the image matrix (subsequently referred to as "pixel") an sRGB value can be read for both the horizontal filter setting 609 and the vertical filter 605 setting. The next step is the calculation of the respective CIE XYZ tristimulus values 607 612 from the sRGB tristimulus values in the form of a linear transformation, which may be carried out by a matrix multiplication. Assuming that the Again the sRGB component values $R_{srgb}$, $G_{srgb}$, $B_{srgb}$ are in the range 0 to 1, the following equation may be used to calculate $C_{linear}$ where C is R, G or B:

$$C_{linear} = \begin{cases} \frac{C_{srgb}}{12.92}, & C_{srgb} \leq 0.04045 \\ \left(\frac{C_{srgb}+a}{1+a}\right)^{2.4}, & C_{srgb} > 0.04045 \end{cases} \quad \text{(Eq. 3)}$$

In the above equation (Eq. 3) a=0.055 and C is R, G or B.

The next step involves putting the resulting values through a matrix multiplication of the linear values in order to get XYZ. The necessary equation (Eq. 4) is specified as follows:

$$\begin{vmatrix} X \\ Y \\ Z \end{vmatrix} = \begin{vmatrix} 0.4124 & 0.3576 & 0.1805 \\ 0.2126 & 0.7152 & 0.0722 \\ 0.0193 & 0.1192 & 0.9505 \end{vmatrix} \begin{vmatrix} R_{linear} \\ G_{linear} \\ B_{linear} \end{vmatrix} \quad \text{(Eq. 4)}$$

Figure 8:
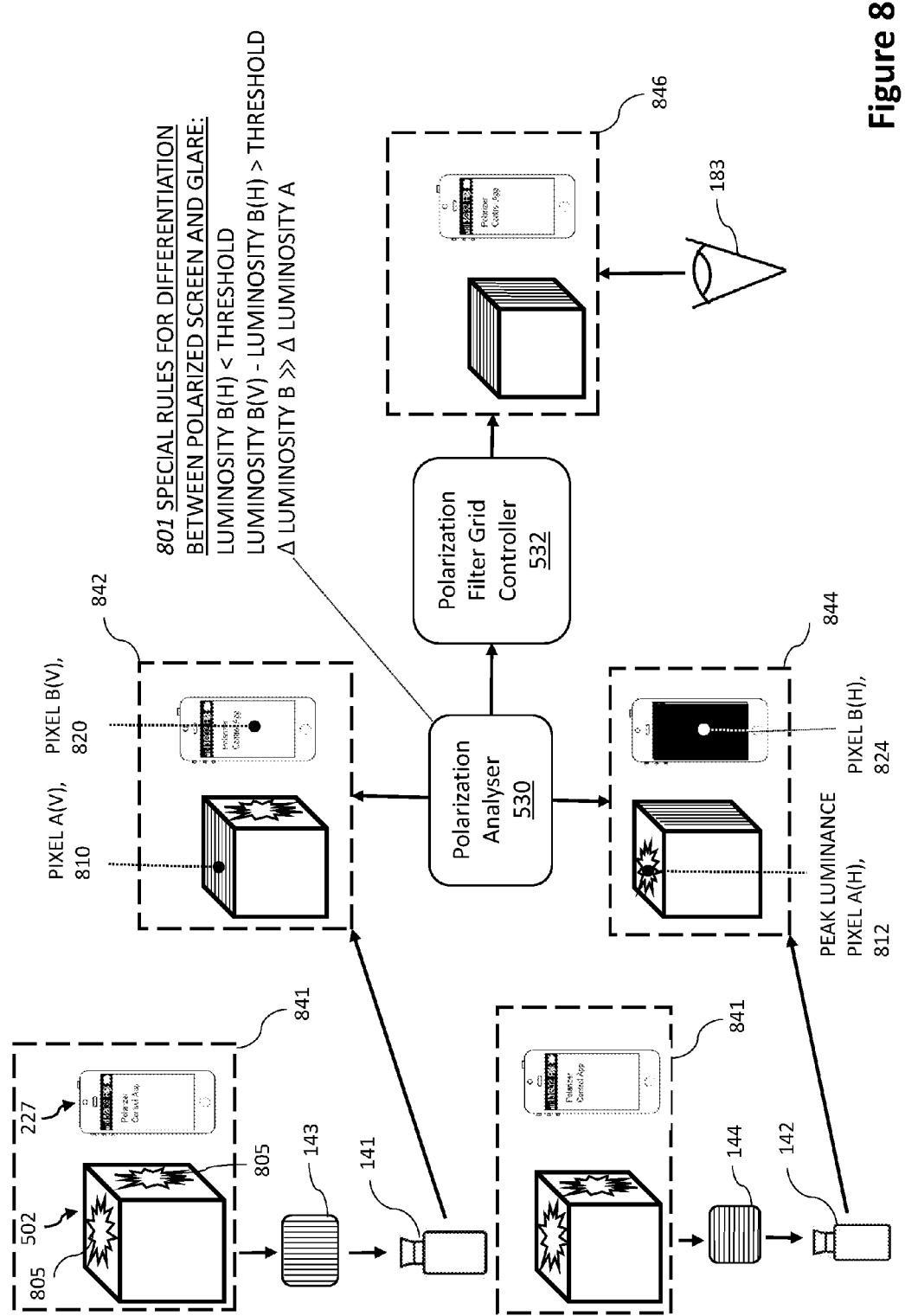
FIG. 8 is a schematic diagram illustrating a method for optimizing polarization filtering including polarized display detection, according to an example embodiment.

The CIE XYZ color space was deliberately designed so that the Y parameter was a measure of the brightness or luminance of a color. The chromaticity of a color was then specified by the two derived parameters x and y, two of the three normalized values which are functions of all three tristimulus values X, Y, and Z. By being able to estimate the level of brightness in this way the described example embodiment then makes use of the linear transformation to estimate whether the horizontally transmissive filter or the vertically transmissive filter has transmitted more specular light. When unpolarized light is hitting a horizontal surface the specular light bounces off the surface, becomes horizontally polarized and heads towards the camera. If it then hits the vertically transmissive polaroid filter it all gets absorbed by the filter. If on the other hand it hits the horizontally transmissive polaroid filter the specular light is passing through unhindered. Meanwhile, the diffuse light that gets absorbed and retransmitted by the surface is unpolarized. Each of the polaroid sheets equally absorbs half of that diffuse light, and the rest hits the camera. So the brightness of a pixel on the polarizer grid always comprises 50 percent of the diffuse light and a variable amount of the specular light. Therefore it is possible to reliably estimate the best polarizing filter setting by comparing the various levels of luminance of a polarizer grid pixel in relation to the various polarizing filter settings. This is what is being achieved in step 614. For example, if the pixel luminance is greater with a horizontally transmissive filter than with a vertically transmissive filter, then the target setting for the corresponding filter cell is set to vertical transmission. This corresponds to step 620 of the flow chart. Step 616 is the equivalent for the alternative polarization scenario, therefore if the pixel luminance is smaller with a horizontally transmissive filter than with a vertically transmissive filter, then the target setting for the corresponding filter cell is set to horizontal transmission. A third scenario 618 is also possible, this occurs if there is no significant difference in relation to the compared pixel-specific horizontal/vertical luminance values. In that case the polarization target for the respective target pixel is set to indeterminate. By following the steps depicted in the flow chart of FIG. 6 one can thus ensure that the largest possible amount of specular light is blocked out. However, the present inventor has realized that one special exception also needs to be taken into account. If the user of a head mountable device embodying the present invention were to look at a display screen emitting polarized light, such as a liquid crystal screen, it is possible that the polarizing analyzer sees a pixel as black in one filter setting and as bright white in another filter setting. The algorithm described above would then erroneously take the darker luminance as indicative of the correct polarization filter target. The screen would consequently appear black to the user, which is not intended. To solve this problem the present inventor has created an embodiment wherein an additional operation is performed in the polarization analyzer. The said embodiment is depicted in FIG. 8. The figure shows a real-word scene comprising a cuboid object 502 which has areas of undesirable glare 805. The scene also comprises a liquid crystal display 227. The scene is subsequently captured by a camera with a horizontally transmissive polaroid filter resulting in image 844 and by a camera with a vertically transmissive polaroid filter resulting in image 842. Both images are processed by the polarization analyzer 530. When comparing pixels of images 844 and 842 the polarization analyzer makes use a special rule 801 in order to be able to differentiate between undesirable glare and a polarized display screen. Such a screen may appear black with one polaroid filter and significantly brighter with another polaroid filter. An area comprising glare, on the other hand, will generally exhibit a lesser luminosity differential with different filters. The polarization analyzer therefore identifies pixels of peak luminance and measures the difference in luminance between different polaroid filters for that pixel. The peak luminance pixels are interpreted to belong to areas of glare and the luminance differences for these pixels can serve as a benchmark for comparing them with pixels related to a suspected display screen. This concept is illustrated in FIG. 8 with the help of example pixels A and B. In the vertically polarized image 842 of the real-world scene 841 these two specific pixels are marked as pixel A(V) 810 and pixel B(V) 820. Correspondingly in the horizontally polarized image 844 there are the equivalent pixels A(H) 812 and B(H) 824. Pixel B is located in an image area associated with a liquid crystal display screen, whereas pixel A is not located in an image area associated with a liquid crystal display screen. In the example, pixel A(H) exhibits more luminosity than pixel A(V), whereas pixel B(V) exhibits more luminosity than pixel A(V). After applying special rule 801 for the polarization analyzer 530, the polarization filter grid controller 532 ensures that the image reaching the user's eye 183 is polarization-optimized in such a way that the real-world glare on the cuboid object is reduced both on its horizontal and vertical surfaces, whilst at the same time ensuring that the liquid crystal display, which is also part of the same real-world scene, does not appear blacked out. In another embodiment instead of comparing peak luminance levels for different filter states, the average luminance differential for different filter setting over a field of view can be used as a benchmark. A pixel is suspected to be related to a display screen if the pixel appears essentially black in one filter setting but not in another filter setting, therefore the luminance differential between different filter settings for pixels relating to a polarized display screen tends to be greater than the differential of said peak luminance. Another characteristic of a polarized display screen is that the luminance tends to be greater than that of surrounding objects due to the backlighting employed in such screen devices. Therefore a pixel that appears essentially black in one polarizing filter setting and brighter than the average pixel brightness summed over the entire field of view is indicative of belonging to a polarized display screen.

In an alternative embodiment the polarization analyzer may also be configured to analyze the expected loss of brightness of light transmitted through each individual element of the said polarization filter grid. As a result of the said the analysis, the polarization analyzer module may not only optimize polarization filter states for each filter grid element but it may also optimize the brightness of the light transmitted through each filter element. An adjustment of the brightness of the transmitted light may be implemented in the form of a spatial light modulator which allows amplitude modulation. Such a spatial light modulator can be placed anywhere in the optical path of the incident light. A spatial light modulator may also form an integral component of stack of polarization rotators. In an embodiment the said spatial light modulator is controlled by the polarization grid controller, which in turn is controlled by the polarization analyzer. Those skilled in the art will appreciate that the spatial light modulator may also normalize other properties of the incident light, so that a user of an embodiment of the present invention may experience the field of view free of pixilation effects. Such pixilation effects would occur when for example when different polarization filter settings are associated with different light absorption characteristics. Also, different filter states may be associated with different wavelength-dependent absorbance characteristics. In the described embodiment it is the task of the said spatial light modulator to normalize such effects in order to avoid pixilation effects which are readily noticeable by a user of the described device.

Figure 4C:
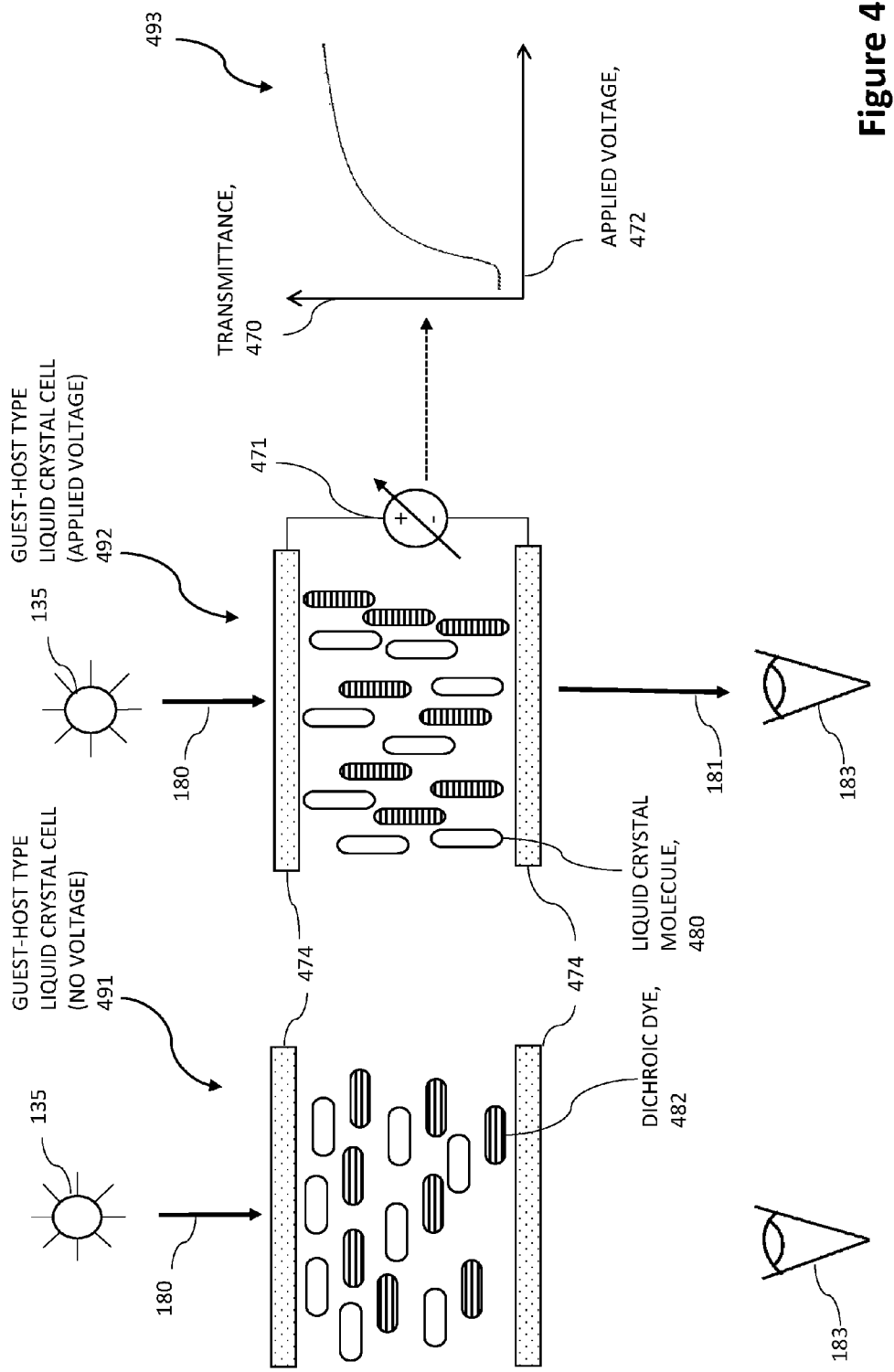
FIG. 4C is a schematic diagram illustrating the construction and function of a guest-host type liquid crystal cell, according to an example embodiment.

In another embodiment the adjustment of the brightness of the transmitted light is achieved by using a guest-host type of homogeneous nematic liquid crystal (GH-LC) cell, as depicted in FIG. 4C, wherein the GH-LC cell comprises black dichroic dye 482 and wherein the polarization analyzer may, via the polarization grid controller, influence both the polarization angle as well as the light absorption characteristics of each individual cell. This is because light absorption of the GH-LC cell for polarized light varies significantly with the external voltage 471 applied to the transparent electrodes of the GH-LC cell. In this way, without any applied voltage 491, the director of liquid crystal and dichroic dye molecules are uniformly aligned parallel to the indium tin oxide surfaces 474, and incident light with a polarization plane parallel to the alignment of the dye molecules is strongly absorbed. Otherwise, when applying a sufficient external voltage to the GH-LC cell 492 the dichroic dye molecules 482 aligned with the liquid molecules 480 are reoriented parallel to the applied electric field, and the light absorbance of the dye is decreased, as can be seen in the graph 493. In graph 493 the y-axis 470 depicts luminous transmittance, whereas the x-axis 472 depicts the applied voltage. The described embodiment using GH-LC cells is utilizing a nematic liquid crystal mixture (JB-1000XX supplied by Chisso) containing black dichroic dye which is sandwiched between polyimide alignment layers rubbed in parallel resulting in GH-LC cells of a thickness of 10 µm.

E. Example Head-Mountable Devices

Systems and devices in which example embodiments can be implemented will now be described in greater detail. In general, an example system can be implemented in or can take the form of a wearable computer (also referred to as a wearable computing device). In an example embodiment, a wearable computer takes the form of or includes a head-mountable device (HMD).

An example system can also be implemented in conjunction with other interconnected components, such as a mobile phone, among other possibilities. An example system can also take the form of a device such as a wearable computer and a plurality of subsystems of such a device.

A head mountable device can generally be any device that is capable of being worn on the head and places a spatial light modulator in front of one or both eyes of the wearer. A head mountable device can take various forms such as a helmet or eyeglasses. As such, references to "eyeglasses" or a "glasses-style" head mountable device should be understood to refer to a head mountable device that has a glasses-like frame so that it can be worn on the head. Further, example embodiments can be implemented by or in association with a head mountable device with no display, a single display or with two displays.

Figure 1:
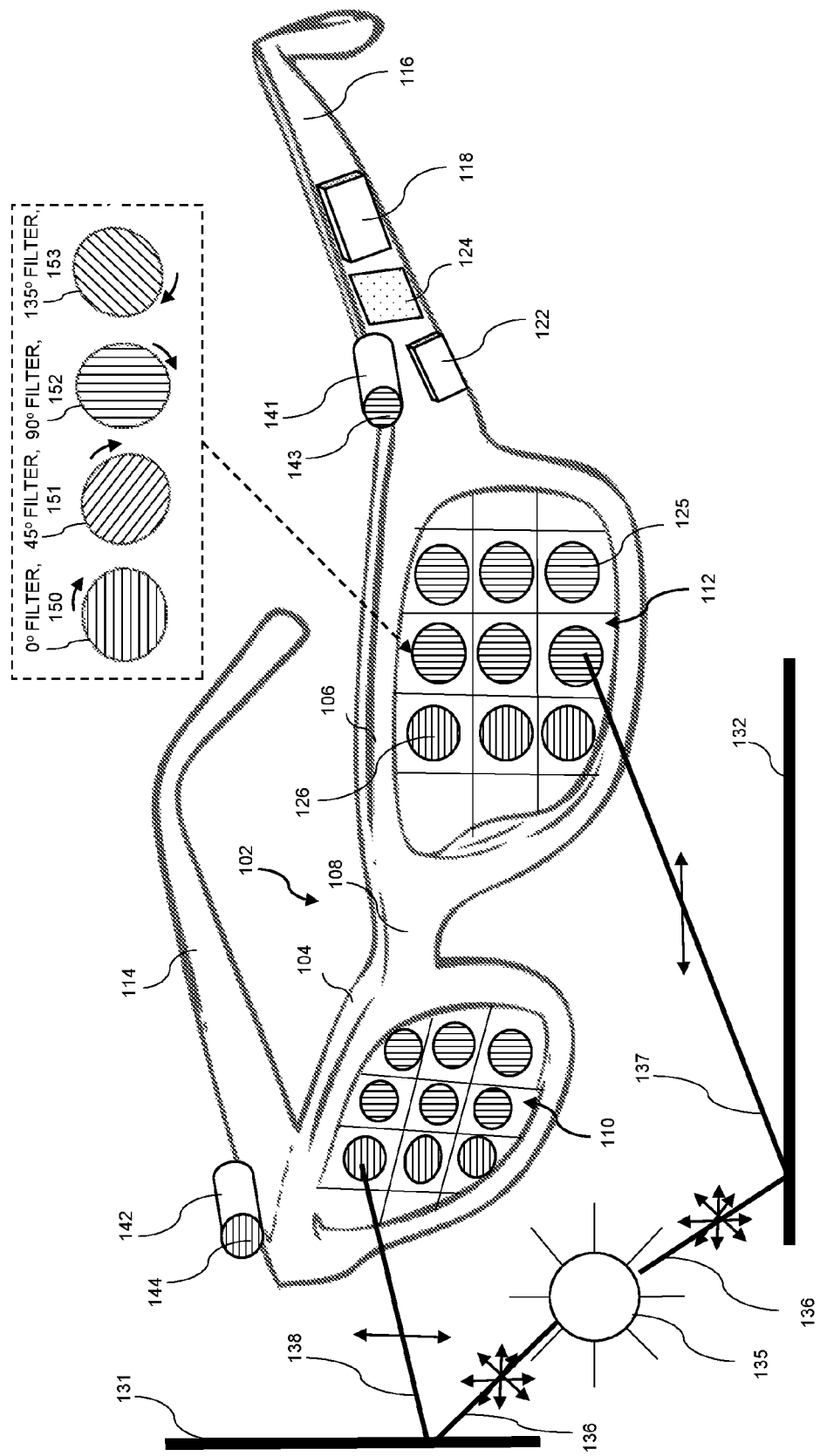
FIG. 1 illustrates a wearable computing system comprising polarization optimization, according to an example embodiment.

FIG. 1 illustrates a wearable computing system according to an example embodiment. In FIG. 1, the wearable computing system takes the form of a head-mountable device (head mountable device) 102. It should be understood, however, that example systems and devices can take the form of or be implemented within or in association with other types of devices, without departing from the scope of the invention. As illustrated in FIG. 1, the head mountable device 102 includes frame elements including lens-frames 104, 106 and a center frame support 108, lens elements 110, 112, and extending side-arms 114, 116. The center frame support 108 and the extending side-arms 114, 116 are configured to secure the head mountable device 102 to a user's face via a user's nose and ears, respectively.

Each of the frame elements 104, 106, and 108 and the extending side-arms 114, 116 can be formed of a solid structure of plastic and/or metal, or can be formed of a hollow structure of similar material so as to allow wiring and component interconnects to be internally routed through the head mountable device 102. Other materials can be possible as well.

One or more of each of the lens elements 110, 112 can be formed of any material that can suitably incorporate a grid of polarization filter stacks such as specified previously. Lens elements 110 and 112 each comprise one single grid, which in the diagram of FIG. 1 is symbolically depicted by the grid lines drawn on each lens element 110, 112. As can be seen in FIG. 1, each of the grid elements comprises one single polarization filter stack. FIG. 4A and FIG. 4B subsequently go on to depict the intrinsic components which make up such a polarization filter stack. In the specific example shown in FIG. 1, polarization filter stack 125 is differentiated from polarization filter stack 126 in terms of polarization selection. In the diagram, the vertical bars drawn on stack 125 denote that stack 125 is momentarily set to filter vertically, whereas conversely the horizontal bars of stack 126 denote that that filter is momentarily set for horizontal polarization filtering. FIG. 1 depicts a preferred embodiment, wherein any one of the stacks can be dynamically set at runtime to one of four possible distinct polarization filter states: 0 degree filtering 150, 45 degree filtering 151, 90 degree filtering 152 and 135 degree filtering 153. So when a light source 135 produces rays 136 of unpolarized light, these rays may subsequently reflect off a surface. If said surface is a vertical surface, such as 131, then the reflected light ray becomes a vertically polarized ray 138. If, on the other hand, said surface is a horizontal one, such as 132, then a reflected ray 137 will exhibit a horizontal polarization state. The lens elements can additionally facilitate an augmented reality or heads-up display where the projected image or graphic is superimposed over a real-world view as perceived by the user through the lens elements.

The extending side-arms 114, 116 can each be projections that extend away from the lens-frames 104, 106, respectively, and can be positioned behind a user's ears to secure the head mountable device 102 to the user. The extending side-arms 114, 116 can further secure the head mountable device 102 to the user by extending around a rear portion of the user's head. Additionally or alternatively, for example, the head mountable device 102 can connect to or be affixed within a head-mounted helmet structure. Other configurations for a head mountable device are also possible.

The head mountable device 102 can also include an on-board computing system 118, and a variety of optional utility devices, such as an image capture device or a finger-operable touch pad. The on-board computing system 118 is shown to be positioned on the extending side-arm 114 of the head mountable device 102; however, the on-board computing system 118 can be provided on other parts of the head mountable device 102 or can be remotely positioned from the head mountable device 102 (e.g. the on-board computing system 118 could be wire- or wirelessly-connected to the head mountable device 102). The on-board computing system 118 can include a processor and memory, for example. The on-board computing system 118 can be configured to receive and analyze data from the said utility sensors and generate images for output by an optional augmented reality (AR) display device.

The sensor 122 is shown on the extending side-arm 116 of the head mountable device 102; however, the sensor 122 can be positioned on other parts of the head mountable device 102. For illustrative purposes, only one sensor 122 is shown. However, in an example embodiment, the head mountable device 102 can include any number of additional utility sensors.

Further, although FIG. 1 illustrates two image capture devices 141 and 142, more image capture devices can be used, and each can be configured to capture the same view, or to capture different views. Moreover, the depicted image capture devices 141 and 142 are primarily tasked with capturing imaging data required by the polarization analyzer module and any secondary use of these image capture devices as ordinary utility sensors needs to ensure that the requirements of the polarization analyzer are not compromised. Alternatively additional cameras may be installed as general purpose image capture devices.

The finger-operable touch pad 124 is shown on the extending side-arm 114 of the head mountable device 102. However, the finger-operable touch pad 124 can be positioned on other parts of the head mountable device 102. Also, more than one finger-operable touch pad can be present on the head mountable device 102. The finger-operable touch pad 124 can be used by a user to input commands. If more than one finger-operable touch pad is present, each finger-operable touch pad can be operated independently, and can provide a different function.

In a further aspect, head mountable device 102 can be configured to receive user input in various ways, in addition or in the alternative to user input received via finger-operable touch pad 124. For example, on-board computing system 118 can implement a speech-to-text process and utilize a syntax that maps certain spoken commands to certain actions. In addition, head mountable device 102 can include one or more microphones via which a wearer's speech can be captured. Configured as such, head mountable device 102 can be operable to detect spoken commands and carry out various computing functions that correspond to the spoken commands.

As another example, head mountable device 102 can interpret certain hand or eye gestures as user input. As a further example, head mountable device 102 can interpret eye movement as user input. In alternative embodiments, display elements can be introduced to the system. For example, the lens elements 110, 112 themselves can include: a transparent or semi-transparent matrix display, such as an electroluminescent display or a liquid crystal display, one or more waveguides for delivering an image to the user's eyes, or other optical elements capable of delivering an in focus near-to-eye image to the user. Alternatively or additionally, a laser or LED source and scanning system could be used to draw a raster display directly onto the retina of one or more of the user's eyes. Other possibilities exist as well.

F. Example System Architecture

Figure 10:
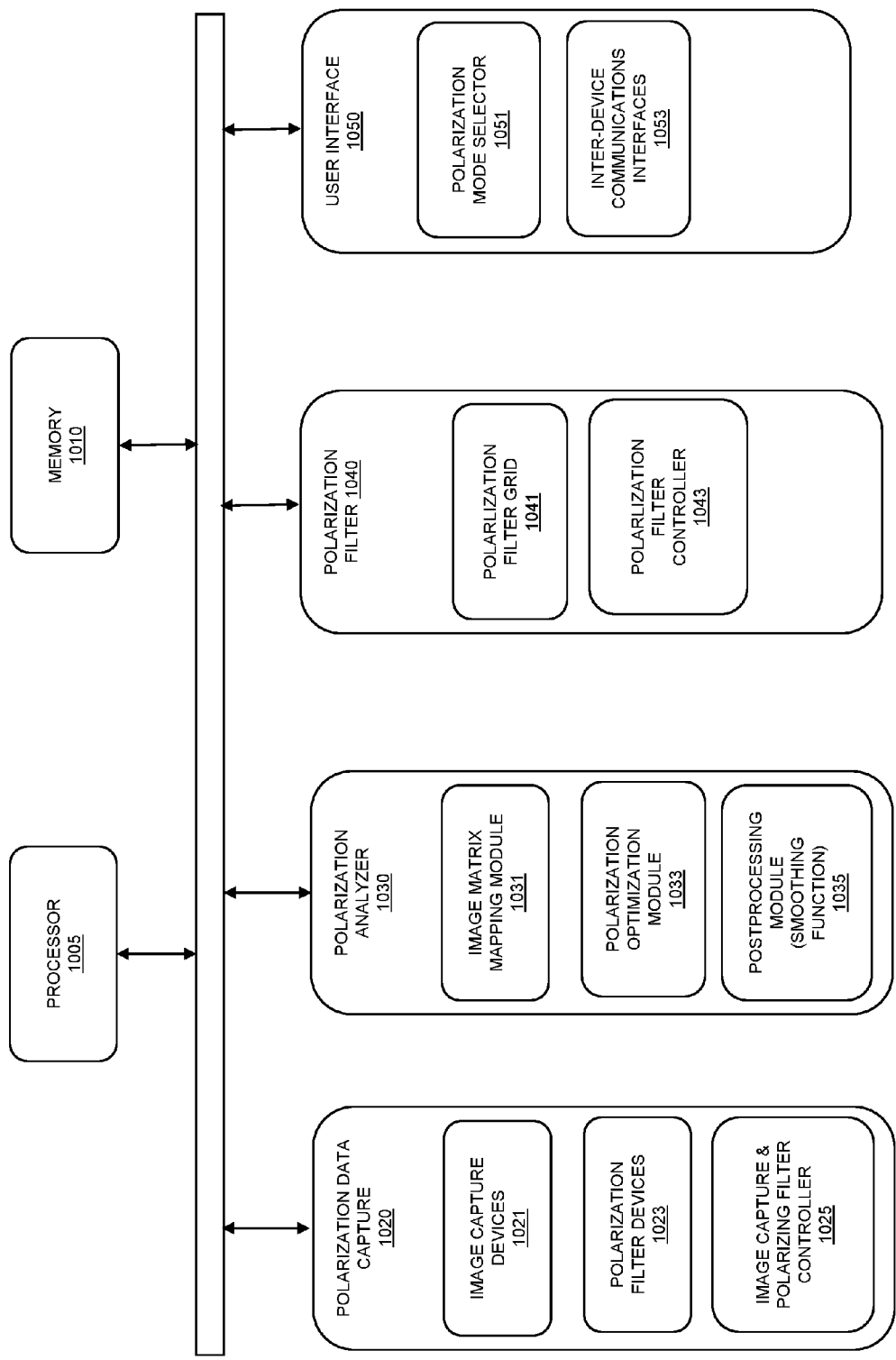
FIG. 10 is a block diagram illustrating the system architecture of an example embodiment.

FIG. 10 is a block diagram illustrating an example system architecture for various embodiments of the present invention. The example system depicted comprises a plurality of at least one processor 1005 and memory 1010. As depicted by block 1020 a polarization data capture module comprises a plurality of image capture devices 1021, a plurality of polarization filter devices 1023 and an image capture and polarizing filter controller 1025. Block 1030 depicts the polarization analyzer module, which comprises an image matrix mapping module 1031, a polarization optimization module 1033 and a post processing module 1035 comprising a smoothing method. The image matrix mapping module 1031 is responsible for taking images captured by the polarization data capture module 1020 and mapping them onto a matrix where each element corresponds to an electrically-controllable polarization filter cell 123 in a filter grid 110 of a head mountable device 102. The polarization optimization module 1033 is responsible for determining a preferred polarization filter target state for each individual filter cell 123. The post processing module 1035 is tasked with recognizing polarization patterns spanning multiple filter cells and applying a smoothing function so that undesirable abrupt transitions and single-pixel abnormalities are avoided such as to provide an enhanced user experience. The polarization filter module is depicted in block 1040 and comprises a plurality of polarization filter grids 1041 and a polarization filter controller 1043. The polarization filter grids 1041 comprise both filter grids 110 and 112 intended for the left and right eye of a user of the embodiment. The polarization filter controller 1040 is tasked with converting the polarization targets computed by the polarization analyzer 1030 and converting the into control inputs for the polarization filter grid 1040. Block 1050 depicts the user interface module, comprising a polarization selector module

1051 and a plurality of inter-device communications interfaces 1053. The polarization mode selector can have multiple implementations in a single embodiment, such as being a tap-pad, a voice command interface or an app on a smartphone. Other implementations are also possible. The inter-device communications interfaces 1053 are used to communicate with user interface components hosted on devices other than the head-mountable device described in various embodiments. The said interfaces allow the user to interface a smartphone controller app via a Bluetooth or a wireless local area network (WLAN) connection for example.

G. Example Methods of Operation

The preferred embodiment of the present invention comprises a head mountable device having the general appearance of eyeglasses designed for sun protection 102. When such device is worn a user 102 has a number of different possibilities to interact with such device. The primary objective of such interaction is generally to select the desired mode of operation. The modes of operation for a preferred embodiment are depicted in FIG. 8. FIG. 2 depicts how the user is able to switch between said modes of operation. The preferred method to change polarizer settings comprises use of the touchpad 240. A tap on the touchpad causes the selection of a different polarizer mode. The user can thus iterate through all available modes by means of repeatedly tapping the touchpad. The preferred embodiment also offers the option of changing polarizer mode by voice command 250. An advantage of using voice commands is that the user can name the desired mode and is not forced to reach the desired mode by means of iteration. A third preferred way of configuring the polarizer is to interface the polarizer via smartphone app 227. For that purpose the head mountable device is interfaced with a smartphone-type device via a Bluetooth connection 225 226. The present invention may also be practiced with other suitable methods for controlling the user interface of the respective embodiment.

H. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise.

The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the diagrams, scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the diagrams, scenarios, and flow charts discussed herein, and these diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

DEFINITIONS AND CLARIFICATIONS

Herein below are a few definitions and clarifications. As used herein:

The terms "a" and "an", when modifying a noun, do not imply that only one of the noun exists.

The term "comprise" (and grammatical variations thereof) shall be construed broadly, as if followed by "Without limitation". If A comprises B, then A includes B and may include other things.

The term "e. g." means including without limitation. The fact that an "example" or multiple examples of something are given does not imply that they are the only instances of that thing. An example (or a group of examples) is merely a non-exhaustive and non-limiting illustration.

In the context of a head mountable device (and components of the device), "front" is optically closer to the light source, and "rear" is optically further from the light source. A stack of polarization rotators is a display device or a component of a display device; thus, a stack of polarization rotators has a "front" and a "rear".

The term "include" (and grammatical variations thereof) shall be construed broadly, as if followed by "Without limitation".

"Intensity" shall be construed broadly to include any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure and radiant energy density.

The term "Malus' law" shall be construed broadly to include any formulation of that law and any computation equivalent to that law.

The term "or" is an inclusive disjunctive. For example "A or B" is true if A is true, or B is true, or both A or B are true.

"Parallax" includes binocular parallax and motion parallax. A display exhibits binocular parallax, if the apparent position of an object viewed by the left eye and the right eye of a human viewer differs because of the different positions of the two eyes. A display exhibits motion parallax, if the apparent position of an object appears to change as the viewpoint of the human viewer moves (e.g., by moving the viewer's head).

A parenthesis is simply to make text easier to read, by indicating a grouping of words. A parenthesis does not mean that the parenthetical material is optional or can be ignored.

To vary something "per pixel" means to vary it at respective pixels. A "pixel" includes the smallest addressable element visible through an exit pupil of an optical device. For example, a light-transmitting head mountable device may have pixels even if it does not comprise a display screen.

A "polarization rotator" is a device configured to change the polarization state of light that travels through the device. For example, a polarization rotator may comprise a layer of liquid crystal between a pair of transparent electrodes. Or, for example, any device that alters the polarization state rotation of light passing through the device is a polarization rotator.

The term "polarization state rotation" shall be construed broadly. For example, the term includes a rotation of the angle of polarization of linearly polarized light.

The term "polarizer" means a device that alters light according to the light's polarization state. For example, a polarizing diffuser is a "polarizer".

What is claimed is:

1. A method for adaptive polarization filtering, comprising, in combination:
    (a) routing incident light through a grid to an entrance pupil of a human eye, wherein said grid comprises a plurality of stacks and wherein each stack comprises a plurality of electrically controllable polarization rotators; and
    (b) using one or more processors
        (i) to perform an optimization calculation for glare reduction, wherein the optimization calculation is configured to compute a set of polarization rotation targets which are to be induced in the incident light by respective polarization rotators; and
        (ii) to output control signals to the respective polarization rotators wherein the control signals relay said polarization rotation targets.

2. The method of claim 1, wherein said grid is part of an eyepiece of a see-through head-mountable device.

3. The method of claim 2, wherein the grid comprises an array of at least 640 by 480 stacks.

4. The method of claim 3, wherein at least one of the plurality of polarization rotators comprises silver nanowire-based transparent electrodes.

5. The method of claim 2, wherein the optimization calculation comprises input parameters relating to pixel-specific sRGB tristimulus values derived from a plurality of polarizer-variant images of a similar field of view as that seen by the user of the head mountable device.

6. The method of claim 5, wherein the optimization calculation comprises a plurality of transformations of the pixel-specific sRGB tristimulus values to CIE xyY color space values.

7. The method of claim 6, wherein the Y-values of the CIE xyY color space values are used as parameters for comparing alternative polarizing filter settings in the optimization calculation and wherein the polarization angle of the polarizer associated with the lowest Y-value of a set of polarizer-variant pixel-associated Y-values is considered indicative of an optimum polarization rotation target.

8. The method of claim 1, wherein at least one anisotropic absorber is positioned in the path of the incident light after the plurality of said stacks.

9. The method of claim 8, wherein at least one of the anisotropic absorbers comprises a guest-host type liquid crystal cell.

10. The method of claim 8, wherein exactly one anisotropic absorber is provided for the grid.

11. The method of claim 1 further comprising a step of using the one or more processors to perform a normalizing calculation relating to a target brightness of light transmitted through each of the stacks and to output control signals to dynamically control light transmittance characteristics of the plurality of the stacks.

* * * * *